(12) United States Patent
Hong

(10) Patent No.: US 12,554,419 B2
(45) Date of Patent: Feb. 17, 2026

(54) MEMORY DEVICE WITH ROW ADDRESS REPEATER CONTROLLING MEMORY BANK

(71) Applicant: SAMSUNG ELECTRONICS CO., LTD., Suwon-si (KR)

(72) Inventor: Seungki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 18/156,266

(22) Filed: Jan. 18, 2023

(65) Prior Publication Data
US 2024/0036745 A1    Feb. 1, 2024

(30) Foreign Application Priority Data
Jul. 29, 2022 (KR) .......... 10-2022-0095080

(51) Int. Cl.
G06F 3/06 (2006.01)
(52) U.S. Cl.
CPC .......... G06F 3/0625 (2013.01); G06F 3/0629 (2013.01); G06F 3/0673 (2013.01)
(58) Field of Classification Search
CPC ..... G06F 3/0625; G06F 3/0629; G06F 3/0673
See application file for complete search history.

(56) References Cited

U.S. PATENT DOCUMENTS

| | | | |
|---|---|---|---|
| 7,280,412 B2 | 10/2007 | Jang et al. | |
| 7,400,541 B2 | 7/2008 | Jang et al. | |
| 8,018,358 B2 | 9/2011 | Hollis | |
| 8,923,079 B1 | 12/2014 | Park et al. | |
| 9,087,025 B2 | 7/2015 | Hollis | |
| 9,529,749 B2 | 12/2016 | Hollis | |
| 9,798,693 B2 | 10/2017 | Hollis | |
| 10,446,207 B2 | 10/2019 | Kim et al. | |
| 10,606,689 B2 | 3/2020 | Kwak et al. | |
| 11,120,849 B2 | 9/2021 | Kondo et al. | |
| 11,221,909 B2 | 1/2022 | Kwak et al. | |
| 11,281,616 B2 | 3/2022 | Dadual et al. | |
| 2007/0001982 A1* | 1/2007 | Ito | G09G 3/2011 345/98 |
| 2007/0115733 A1 | 5/2007 | Jang et al. | |
| 2008/0019451 A1 | 1/2008 | Jang et al. | |
| 2008/0239840 A1* | 10/2008 | Park | G11C 8/08 365/230.03 |

(Continued)

FOREIGN PATENT DOCUMENTS

| | | |
|---|---|---|
| KR | 20150025764 A | 3/2015 |
| KR | 20180117041 A | 10/2018 |
| KR | 102104578 B1 | 4/2020 |

*Primary Examiner* — Gary W. Cygiel
(74) *Attorney, Agent, or Firm* — Wolf, Greenfield & Sacks, P.C.

(57) ABSTRACT

Disclosed is a memory device, which may include memory banks including a plurality of memory cells, row address repeaters that transfer a row address to the memory banks, and control logic that controls data input/output of the memory banks. The memory banks may be grouped into a plurality of bank groups, and the row address repeaters may be grouped into a plurality of repeater groups respectively corresponding to the plurality of bank groups. The control logic may control the row address repeaters according to activation status of the plurality of bank groups.

20 Claims, 10 Drawing Sheets

(56) References Cited

U.S. PATENT DOCUMENTS

| | | |
|---|---|---|
| 2010/0199017 A1 | 8/2010 | Hollis |
| 2010/0214138 A1 | 8/2010 | Hollis |
| 2014/0281075 A1 | 9/2014 | Hollis |
| 2017/0075854 A1 | 3/2017 | Hollis |
| 2018/0300200 A1 | 10/2018 | Kwak et al. |
| 2019/0156877 A1 | 5/2019 | Chan-Kyung et al. |
| 2019/0325926 A1 | 10/2019 | Kondo et al. |
| 2020/0192747 A1 | 6/2020 | Kwak et al. |
| 2020/0285599 A1 | 9/2020 | Dadual et al. |
| 2021/0217452 A1* | 7/2021 | Park ............... G11C 8/10 |
| 2022/0139489 A1* | 5/2022 | Rehmeyer ......... G11C 11/4087 714/711 |

* cited by examiner

MEMORY DEVICE WITH ROW ADDRESS REPEATER CONTROLLING MEMORY BANK

CROSS-REFERENCE TO RELATED APPLICATIONS

This application claims priority under 35 U.S.C. § 119 to Korean Patent Application No. 10-2022-0095080, filed on Jul. 29, 2022, in the Korean Intellectual Property Office, the disclosures of which are incorporated by reference herein in their entireties.

BACKGROUND

Embodiments of the present disclosure relate to a memory device, and more particularly, relate to a memory device including a row address repeater controlling memory bank group of the memory device.

Semiconductor memory devices are classified into volatile semiconductor memory devices or non-volatile semiconductor memory devices. The volatile semiconductor memory devices are fast in read and write speeds but lose data stored therein when power is not supplied thereto. In contrast, even though power is interrupted (e.g., not supplied), information stored in a non-volatile semiconductor memory device does not disappear. For this reason, non-volatile semiconductor memory devices are used to store information that has to be retained regardless of whether power is supplied thereto.

In general, a memory cell of a volatile semiconductor memory device (e.g., a DRAM) may include one NMOS transistor serving as a switch and one capacitor storing electric charge (data). The binary information "1" or "0" may correspond to the presence or absence of the electric charge stored in the capacitor in the memory cell, that is, whether a terminal voltage of the cell capacitor is high or low. When a voltage corresponding to binary information is applied to the memory cell, write operation may be performed. A read operation may refer to an operation in which the magnitude of the amount of charge in the capacitor changes as a high or low voltage and is detected by an outside device or system of the memory cell. Data retention may not require power consumption in principle as the charges are accumulated in the capacitor. However, since there may be a leakage current in the PN junction of the MOS transistor or the like, the initial amount of stored charge may be lost, and thus data may be lost.

SUMMARY

Embodiments of the present disclosure provide a memory device that efficiently manages power consumption during bank operation by controlling a row address repeater for each group of memory banks.

In addition, embodiments of the present disclosure provide a memory device that efficiently manages power consumption during bank operation by applying a data bus inversion technology to the row address repeater for each group of memory banks.

According to an embodiment of the present disclosure, a memory device comprises memory banks including a plurality of memory cells, row address repeaters configured to transfer a row address to the memory banks, and a control logic configured to control data input/output of the memory banks, and wherein the memory banks are grouped into a plurality of bank groups, wherein the row address repeaters are grouped into a plurality of repeater groups respectively corresponding to the plurality of bank groups, and wherein the control logic is configured to control the row address repeaters according to activation status of the plurality of bank groups. According to an embodiment of the present disclosure, the control logic is configured to drive one or more repeater groups among the plurality of repeater groups corresponding to an activated bank group among the plurality of bank groups, based on an active request received from a controller.

According to an embodiment of the present disclosure, the control logic, based on a distance at which the plurality of bank groups are spaced apart from an input/output pad, is configured to drive at least one of the repeater groups corresponding to at least one of the bank groups having a smaller distance from the input/output pad than that of an activated bank group among the plurality of bank groups without driving at least one other of the repeater groups corresponding to at least one other of the bank groups having a larger distance from the input/output pad than that of the activated bank group.

According to an embodiment of the present disclosure, the plurality of bank groups includes a first bank group closest to an input/output pad, a second bank group spaced apart from the input/output pad further than the first bank group, and a third bank group spaced apart from the input/output pad further than the second bank group, and wherein the plurality of repeater groups include a first repeater group configured to transfer the row address to the first bank group, a second repeater group configured to transfer the row address to the second bank group, and a third repeater group configured to transfer the row address to the third bank group, and wherein the control logic is configured to drive the first repeater group without driving the second repeater group and the third repeater group when the first bank group is activated and the second bank group and the third bank group are deactivated.

According to an embodiment of the present disclosure, the control logic is configured to drive the first repeater group and the second repeater group without driving the third repeater group when the second bank group is activated, and the first bank group and the third bank group are deactivated.

According to an embodiment of the present disclosure, a memory device comprises memory banks including a plurality of memory cells, row address repeaters configured to transfer a current row address to the memory banks, and a control logic configured to control data input/output of the memory banks, and wherein the memory banks are grouped into a plurality of bank groups, wherein the row address repeaters are grouped into a plurality of repeater groups respectively corresponding to the plurality of bank groups, and wherein the control logic is configured to control the row address repeaters of each of the repeater groups to activate the memory banks of each of the bank groups, and perform a data bus inversion operation on the current row address to transfer an inverted row address to the row address repeaters of each of the repeater groups.

According to an embodiment of the present disclosure, the control logic is configured to invert the current row address to provide the inverted row address for the row address repeaters of each of the repeater groups when more than half of bits of the current row address are changed from a previous row address.

According to an embodiment of the present disclosure, the control logic is configured to generate a first intermediate signal including information of a previous row address based on a previous active request, a second intermediate signal including information of the current row address based on a current active request, and a data bus inversion flag by comparing the first intermediate signal with the second intermediate signal.

According to an embodiment of the present disclosure, the control logic, when more than half of bits of the second intermediate signal are changed from the first intermediate signal, is configured to generate the data bus inversion flag to have a high level, and provide a result value for the row address repeaters of each of the repeater groups obtained by performing an XOR operation on the data bus inversion flag and the current row address.

According to an embodiment of the present disclosure, the control logic, when less than half of bits of the second intermediate signal are changed from the first intermediate signal, is configured to generate the data bus inversion flag to have a low level, and provide a result value for the row address repeaters of each of the repeater groups obtained by performing an XOR operation on the data bus inversion flag and the current row address.

According to an embodiment of the present disclosure, the control logic is configured to provide the current row address for the row address repeaters of each of the repeater groups without inverting the current row address when less than half of bits of the current row address are changed from a previous row address.

According to an embodiment of the present disclosure, a memory device comprises memory banks including a plurality of memory cells, row address repeaters configured to transfer a row address to the memory banks, and a control logic configured to control data input/output of the memory banks, and wherein the memory banks are grouped into a first bank group and a second bank group, wherein the row address repeaters are grouped into a first repeater group corresponding to the first bank group and a second repeater group corresponding to the second bank group, wherein the first repeater group is configured to transfer the row address to the first bank group and the second repeater group, wherein the second repeater group is configured to transfer the row address to the second bank group, and wherein the control logic, when an active request corresponding to a memory bank of the first bank group is received without an active request corresponding to a memory bank of the second bank group, is configured to drive the first repeater group without driving the second repeater group.

According to an embodiment of the present disclosure, the first bank group is closer to an input/output pad than the second bank group.

According to an embodiment of the present disclosure, the memory banks are further grouped into a third bank group and a fourth bank group, and wherein the row address repeaters are further grouped into a third repeater group corresponding to the third bank group and a fourth repeater group corresponding to the fourth bank group, wherein the first repeater group is configured to transfer the row address to the first bank group and the second repeater group, based on a first repeater driving signal, wherein the second repeater group is configured to transfer the row address to the second bank group and the third repeater group, based on the first repeater driving signal and a second repeater driving signal, wherein the third repeater group is configured to transfer the row address to the third bank group and the fourth repeater group, based on the first repeater driving signal, the second repeater driving signal, and a third repeater driving signal, and wherein the fourth repeater group is configured to transfer the row address to the fourth bank group, based on the first repeater driving signal, the second repeater driving signal, the third repeater driving signal, and a fourth repeater driving signal.

According to an embodiment of the present disclosure, the control logic is configured to generate a first internal active signal having a first timing and a second internal active signal having a second timing that is later than the first timing of the first internal active signal based on a clock signal received from a controller, obtain internal command address signals from command address information received from the controller based on the first internal active signal and the second internal active signal, generate first intermediate signals by performing a NAND operation on the internal command address signals, generate second intermediate signals based on the first intermediate signals in accordance with the second timing of the second internal active signal, and perform a logical operation on the second intermediate signals to generate the first to fourth repeater driving signals.

According to an embodiment of the present disclosure, the first repeater driving signal has a high level when at least one of the second intermediate signals is at a high level, wherein the second repeater driving signal has a high level when signals corresponding to the second to fourth bank groups among the second intermediate signals are at a high level, wherein the third repeater driving signal has a high level when signals corresponding to the third and fourth bank groups among the second intermediate signals are at a high level, and wherein the fourth repeater driving signal has a high level when a signal corresponding to the fourth bank group among the second intermediate signals is at a high level.

According to an embodiment of the present disclosure, the memory device further comprises a first XOR circuit configured to perform an XOR operation on a data bus inversion flag and a current pre-row address to output the row address, a second XOR circuit configured to perform an XOR operation on the data bus inversion flag and a delayed row address transferred through the row address repeaters to output a restored row address, and a row address decoding circuit configured to decode the restored row address to generate a decoded row address and to transfer the decoded row address to the memory banks, and wherein the control logic is configured to compare a previous row address with the current pre-row address and generates the data bus inversion flag based on a number of transitioned bits of the current pre-row address.

According to an embodiment of the present disclosure, the control logic is configured to compare the previous row address with the current pre-row address, and generate the data bus inversion flag having a high level when the number of transitioned bits of the current pre-row address is more than half of bits of the current pre-row address, wherein the first XOR circuit is configured to output the row address obtained by inverting the current pre-row address, and wherein the second XOR circuit is configured to output the restored row address obtained by inverting the delayed row address.

According to an embodiment of the present disclosure, the control logic is configured to compare the previous row address with the current pre-row address, and generate the data bus inversion flag having a low level when the number of transitioned bits of the current pre-row address is less than half of bits of the current pre-row address, wherein the first XOR circuit is configured to output the row address that is same as the current pre-row address, and wherein the second XOR circuit is configured to output the restored row address that is same as the delayed row address.

According to an embodiment of the present disclosure, the control logic is configured to generate previous internal active signals corresponding to a previous active request and current internal active signals corresponding to a current active request based on a clock signal received from a controller, obtain previous internal command address signals from previous command address information received from the controller based on the previous internal active signals, obtain current internal command address signals from current command address information received from the controller based on the current internal active signals, obtain a first intermediate signal including information of a previous row address from the previous internal command address signals, obtain a second intermediate signal including information of the row address from the current internal command address signals, and generate a data bus inversion flag by comparing the first intermediate signal with the second intermediate signal.

BRIEF DESCRIPTION OF THE FIGURES

A detailed description of each drawing is provided to facilitate a more thorough understanding of the drawings referenced in the detailed description of the present disclosure.

DETAILED DESCRIPTION

Hereinafter, embodiments of the present disclosure may be described in detail and clearly to such an extent that an ordinary one in the art easily implements the present disclosure.

In addition, hereinafter, a dynamic random access memory (DRAM) may be used as an example of a semiconductor device for describing features and functions of the present disclosure. However, a person skilled in the art may easily appreciate other advantages and performance of the present disclosure depending on the content disclosed here. The present disclosure may be implemented or applied through other embodiments. In addition, the detailed description may be changed or modified depending on view points and applications without departing from the claims, the scope and spirit, and any other purposes of the present disclosure.

Figure 1:
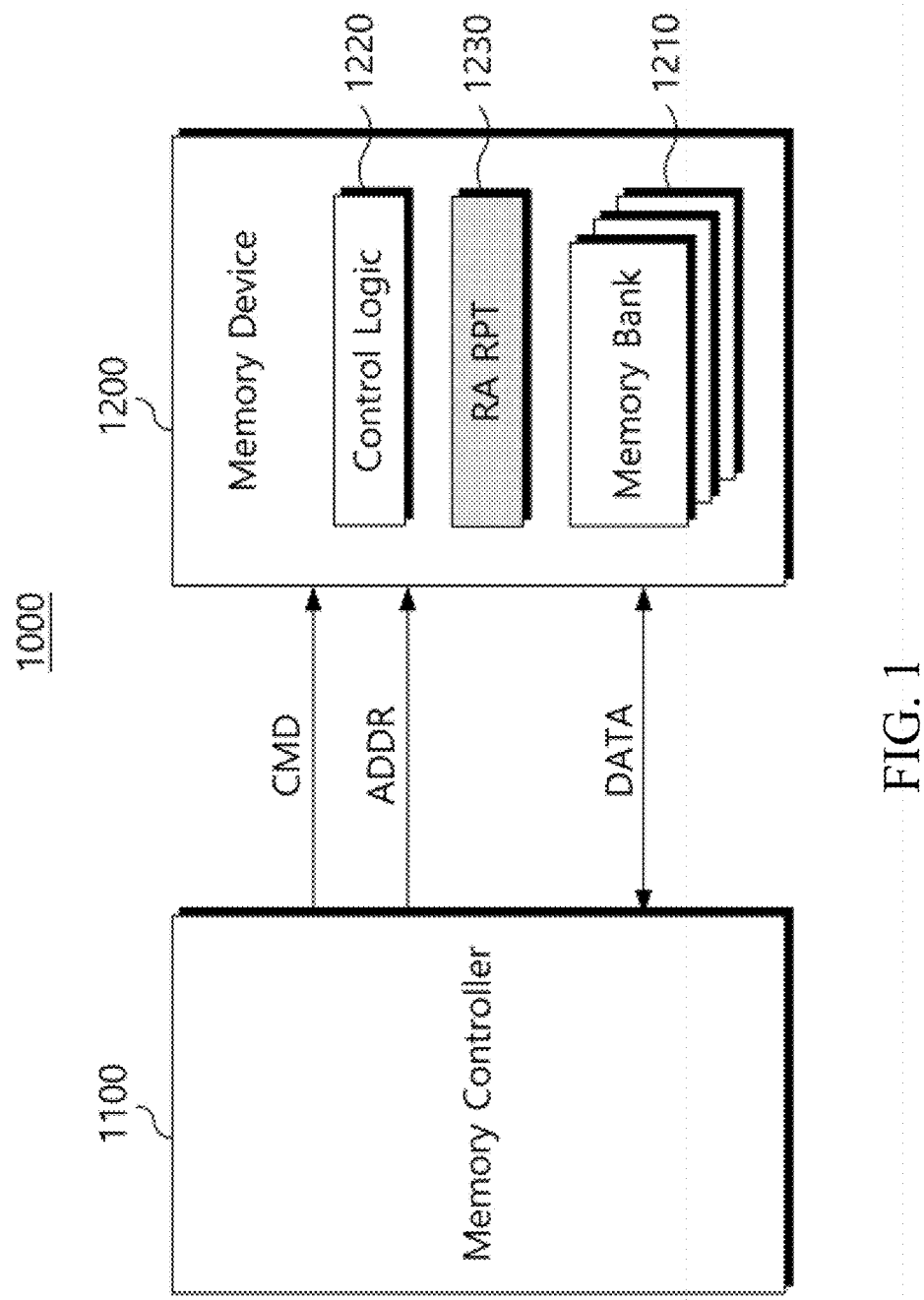
FIG. 1 is a block diagram illustrating a memory system, according to an embodiment.

FIG. 1 is a block diagram illustrating a memory system, according to an embodiment. Referring to FIG. 1, a memory system 1000 of the present disclosure may include a memory controller 1100 and a memory device 1200. The memory device 1200 may include memory banks 1210, control logic 1220, and row address repeaters 1230.

According to an embodiment, the memory controller 1100 may perform an access operation for writing data to the memory device 1200 or reading data stored in the memory device 1200. For example, the memory controller 1100 may generate a command CMD and an address ADDR for writing data to the memory device 1200 or reading data stored in the memory device 1200. The memory controller 1100 may be a memory controller for controlling the memory device 1200, such as a System-on-Chip (SoC), an application processor (AP), a central processing unit (CPU), a digital signal processor (DSP), or a graphics processing unit (GPU).

According to an embodiment, the memory controller 1100 may control the overall operation of the memory device 1200 by providing various signals to the memory device 1200. For example, the memory controller 1100 may control a memory access operation of the memory device 1200 such as a read operation and a write operation. The memory controller 1100 provides the command CMD and the address ADDR to the memory device 1200 to write data DATA to the memory device 1200 or to read data DATA from the memory device 1200.

According to an embodiment, the memory controller 1100 may generate various types of commands CMD to control the memory device 1200. For example, the memory controller 1100 may generate a bank request corresponding to a bank operation of changing states of a memory bank included in memory banks 1210 to read or write data DATA. As an example, the bank request may include an active request for changing a state of the memory bank included in the memory banks 1210 to an active state. The memory device 1200 may activate a row included in the memory bank, that may be, a word line, in response to the active request. The bank request may include a precharge request for converting the memory bank from the active state to a standby state after reading or writing of the data DATA is completed. Also, the memory controller 1100 may generate an I/O request (e.g., a CAS request) for performing a read operation or a write operation of data DATA in the memory device 1200. For example, the input/output request may include a read request for reading data DATA from activated memory banks. The input/output request may include a write request for writing data DATA to the activated memory banks. Also, the memory controller 1100 may generate a refresh command for controlling a refresh operation with respect to the memory banks. However, the types of commands CMD described herein are examples, and other types of commands CMD may exist.

According to an embodiment, the memory device 1200 may output data DATA requested to be read by the memory controller 1100 to the memory controller 1100 or may store data DATA requested to be written by the memory controller 1100 in a memory cell (included in one of the memory banks 1210). The memory device 1200 may input/output data DATA based on the command CMD and the address ADDR.

In this case, the memory device 1200 may be a volatile memory device such as a DRAM, a synchronous dynamic random access memory (SDRAM), a double data rate (DDR) DRAM, a DDR SDRAM, a low power double data rate (LPDDR) SDRAM, a graphics double data rate (GDDR) SDRAM, a rambus dynamic random access memory (RDRAM), and a static random access memory (SRAM). Alternatively, the memory device 1200 may also be implemented in a non-volatile memory device such as a resistive RAM (RRAM), a phase change memory (PRAM), a magnetoresistive memory (MRAM), a ferroelectric memory (FRAM), a spin injection magnetization inversion memory (STT-RAM), etc. In the present specification, the advantages of the present disclosure are described based on DRAM, but the embodiments of the present disclosure are not limited thereto.

According to an embodiment, the memory banks 1210 may include a memory cell array divided (e.g., grouped) by bank units, a row decoder, a column decoder, a sense amplifier, a write driver, etc. The memory banks 1210 may store write-requested data DATA in the memory device 1200 through the write driver, and may read the read-requested data DATA using the sense amplifier. In addition, a configuration for a refresh operation for storing and maintaining data in the cell array or selection circuits according to address may be further included.

According to an embodiment, the control logic 1220 may receive the command CMD and the address ADDR from the memory controller 1100. The control logic 1220 may control operations such as writing, reading, or erasing of the memory device 1200 according to the command CMD and the address ADDR.

According to an embodiment, the memory device 1200 may include row address repeaters 1230 between the memory banks 1210. For example, as the distance from an input/output pad of the memory device 1200 increases, a strength of the row address signal transferred to the memory banks 1210 may decrease. Accordingly, the memory device 1200 may use the row address repeaters 1230 to accurately transfer the row address signal regardless of the distance from the input/output pad. The meaning of a "distance" (e.g., close, closer, closest, far, farther, farthest, further, and furthest) in the description herein includes an electrical distance and a physical distance between two components.

According to an embodiment, the memory device 1200 may divide (e.g., group) the memory banks 1210 into at least one or more groups. The memory device 1200 may control the row address repeaters 1230 connected between the memory banks 1210 for each memory bank group. Accordingly, when only the memory bank adjacent to the input/output pad is activated, only the row address repeaters connected to the memory bank group including the activated memory bank are activated and the remaining row address repeaters are deactivated, thereby reducing power consumption.

According to an embodiment, the memory device 1200 may apply a data bus inversion to a row address signal transferred through the row address repeaters for each memory bank group to reduce power consumption even when a memory bank far from the input/output pad is activated.

Figure 2:
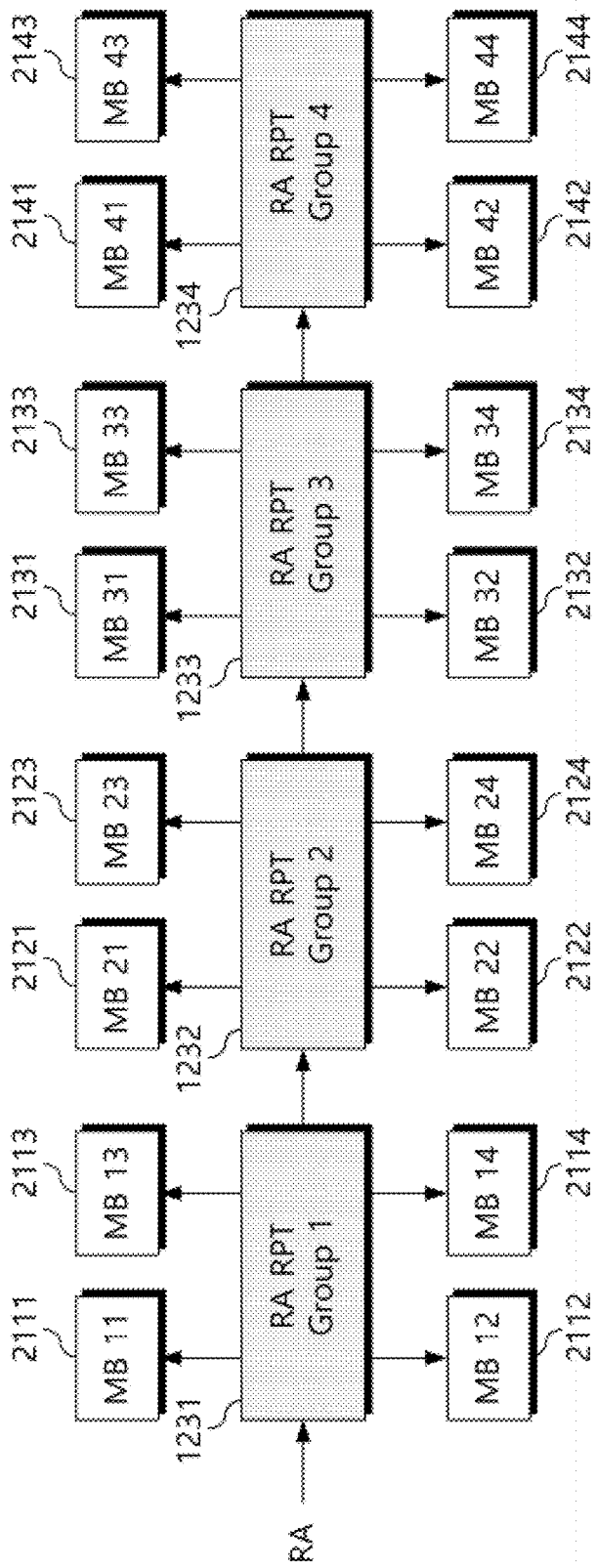
FIG. 2 is a diagram illustrating groups of row address repeaters connected to memory banks of FIG. 1.

FIG. 2 is a diagram illustrating groups of row address repeaters connected to memory banks of FIG. 1. Referring to FIGS. 1 and 2, for example, the memory banks 1210 may be divided (e.g., grouped) into a first bank group, a second bank group, a third bank group, and a fourth bank group. The first bank group may include a 11th memory bank 2111, a 12th memory bank 2112, a 13th memory bank 2113, and a 14th memory bank 2114. The second bank group may include a 21st memory bank 2121, a 22nd memory bank 2122, a 23rd memory bank 2123, and a 24th memory bank 2124. The third bank group may include a 31st memory bank 2131, a 32nd memory bank 2132, a 33rd memory bank 2133, and a 34th memory bank 2134. The fourth bank group may include a 41st memory bank 2141, a 42nd memory bank 2142, a 43rd memory bank 2143, and a 44th memory bank 2144. However, this is an example embodiment, and the memory banks 1210 may be divided (e.g., grouped) into at least one or more bank groups. Hereinafter, for convenience of description, it is assumed that the 11th memory bank 2111 and the 12th memory bank 2112 are memory banks closest to the input/output pad, and the 43rd memory bank 2143 and the 44th memory bank 2144 are memory banks furthest from the input/output pad.

According to an embodiment, the row address repeaters 1230 may be connected between the memory banks 1210. The row address repeaters 1230 may be divided (e.g., grouped) into a plurality of groups. For example, the row address repeaters 1230 may be divided (e.g., grouped) into a first row address repeater group 1231, a second row address repeater group 1232, a third row address repeater group 1233, and a fourth row address repeater group 1234. However, this is only an example embodiment, and the number of row address repeater groups may be determined to correspond to the number of groups of the memory banks 1210. Each of the first row address repeater group 1231, the second row address repeater group 1232, the third row address repeater group 1233, and the fourth row address repeater group 1234 may include a plurality of row address repeaters.

According to an embodiment, the first row address repeater group 1231 may transfer a row address RA to the 11th memory bank 2111, the 12th memory bank 2112, the 13th memory bank 2113, the 14th memory bank 2114, and the second row address repeater group 1232. The second row address repeater group 1232 may transfer the row address RA to the 21st memory bank 2121, the 22nd memory bank 2122, the 23rd memory bank 2123, the 24th memory bank 2124, and the third row address repeater group 1233. The third row address repeater group 1233 may transfer the row address RA to the 31st memory bank 2131, the 32nd memory bank 2132, the 33rd memory bank 2133, the 34th memory bank 2134, and the fourth row address repeater group 1234. The fourth row address repeater group 1234 may transfer the row address RA to the 41st memory bank 2141, the 42nd memory bank 2142, the 43rd memory bank 2143, and the 44th memory bank 2144.

Figure 3:
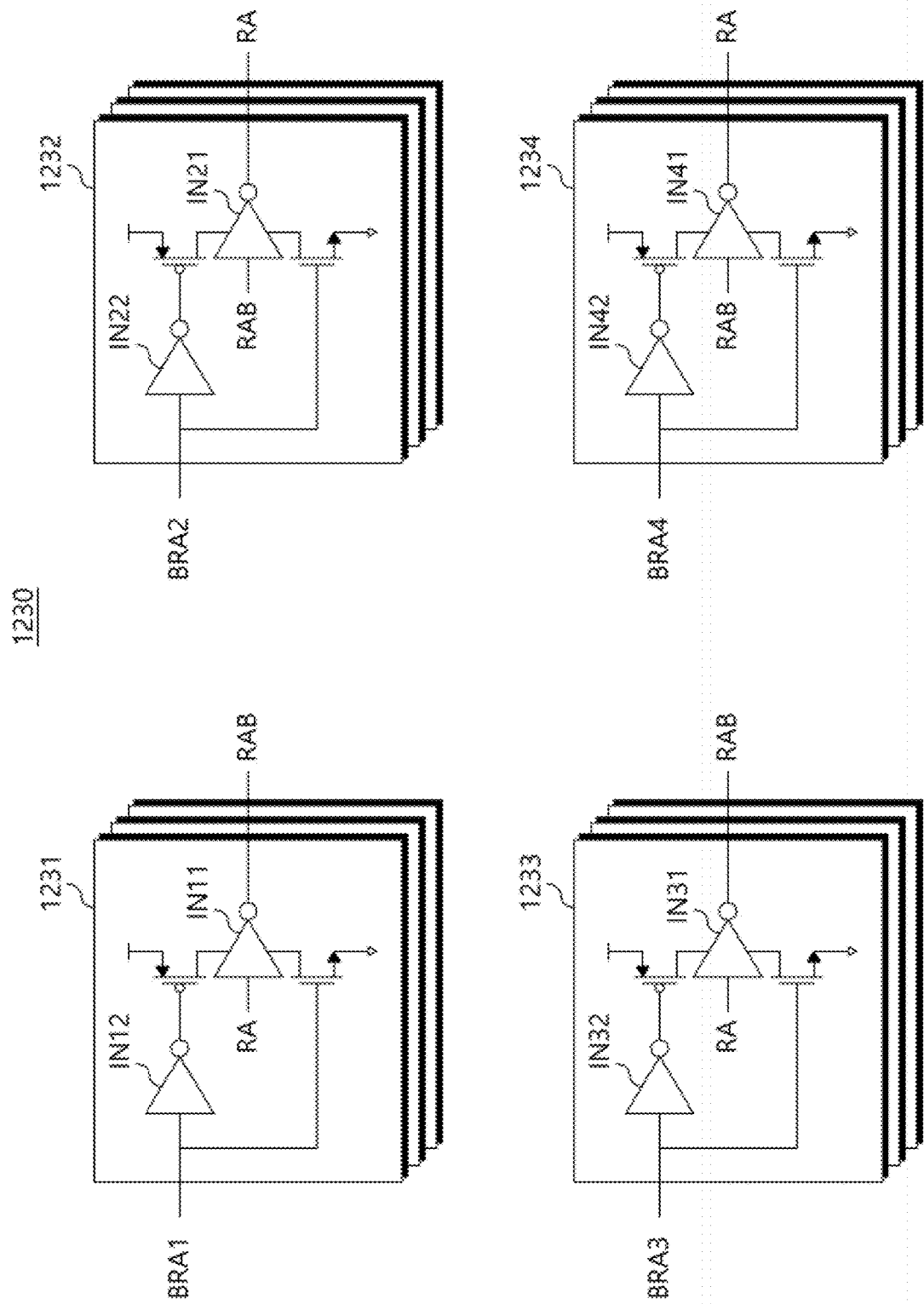
FIG. 3 is a diagram illustrating row address repeaters included in row address repeater groups of FIG. 2.

FIG. 3 is a diagram illustrating row address repeaters included in row address repeater groups of FIG. 2. Referring to FIGS. 2 and 3, a row address repeater group may include at least one row address repeater. One row address repeater may include two inverters. For example, the first row address repeater group 1231 may receive the row address RA and may transfer an inverted row address RAB to the first bank group (e.g., 2111 to 2114 in FIG. 2) and the second row address repeater group 1232. The second row address repeater group 1232 may receive the inverted row address RAB and may transfer the row address RA to the second bank group (e.g., 2121 to 2124 in FIG. 2) and the third row address repeater group 1233. The third row address repeater group 1233 may receive the row address RA and may transfer the inverted row address RAB to the third bank group (e.g., 2131 to 2134 in FIG. 2) and the fourth row address repeater group 1234. The fourth row address repeater group 1234 may receive the inverted row address RAB and may transfer the row address RA to the fourth bank group (e.g., 2141 to 2144 in FIG. 2).

According to an embodiment, the row address repeater of the first row address repeater group 1231 may receive the row address RA and may output the inverted row address RAB, in response to a first repeater driving signal BRA1. For example, a 11th inverter IN11 may invert the row address RA to output the inverted row address RAB. The 11th inverter IN11 may be driven by an inverted signal of the first repeater driving signal BRA1 through a 12th inverter IN12 and the first repeater driving signal BRA1.

According to an embodiment, the row address repeater of the second row address repeater group 1232 may receive the inverted row address RAB and may output the row address RA, in response to a second repeater driving signal BRA2. For example, a 21st inverter IN21 may invert the inverted row address RAB to output the row address RA. The 21st inverter IN21 may be driven by an inverted signal of the second repeater driving signal BRA2 through a 22nd inverter IN22 and the second repeater driving signal BRA2.

According to an embodiment, the row address repeater of the third row address repeater group 1233 may receive the row address RA and may output the inverted row address RAB, in response to a third repeater driving signal BRA3. As an example, a 31st inverter IN31 may invert the row address RA to output the inverted row address RAB. The 31st inverter IN31 may be driven by an inverted signal of the third repeater driving signal BRA3 through a 32nd inverter IN32 and the third repeater driving signal BRA3.

According to an embodiment, the row address repeater of the fourth row address repeater group 1234 may receive the inverted row address RAB and may output the row address RA, in response to a fourth repeater driving signal BRA4. For example, a 41st inverter IN41 may invert the inverted row address RAB to output the row address RA. The 41st inverter IN41 may be driven by an inverted signal of the fourth repeater driving signal BRA4 through a 42nd inverter IN42 and the fourth repeater driving signal BRA4.

As described above, the row address repeaters included in the first row address repeater group 1231 to the fourth row address repeater group 1234 may operate in units of groups, based on the first repeater driving signal BRA1 to the fourth repeater driving signal BRA4. As an example, when a memory bank in the first bank group (e.g., one of the 11th memory bank 2111 to the 14th memory bank 2114) is activated and the remaining memory banks are deactivated, the first row address repeater group 1231 may be driven and the remaining row address repeater groups 1232, 1233, and 1234 may not be driven. As another example, when a memory bank in the second bank group (e.g., one of the 21st memory bank 2121 to the 24th memory bank 2124) is activated and the remaining memory banks are deactivated, the first row address repeater group 1231 and the second row address repeater group 1232 may be driven, and the remaining row address repeater groups 1233 and 1234 may not be driven. As another example, when a memory bank in the third bank group (e.g., one of the 31st memory bank 2131 to the 34th memory bank 2134) is activated and the remaining memory banks are deactivated, the first row address repeater group 1231, the second row address repeater group 1232, and the third row address repeater group 1233 may be driven, and the fourth row address repeater group 1234 may not be driven. As another example, when a memory bank in the fourth bank group (e.g., one of the 41st memory bank 2141 to the 44th memory bank 2144) is activated, the first row address repeater group 1231 to the fourth row address repeater group 1234 may be driven. Accordingly, the memory device 1200 may turn off the row address repeater corresponding to the deactivated memory bank for each bank group, thereby reducing power consumption.

Figure 4:
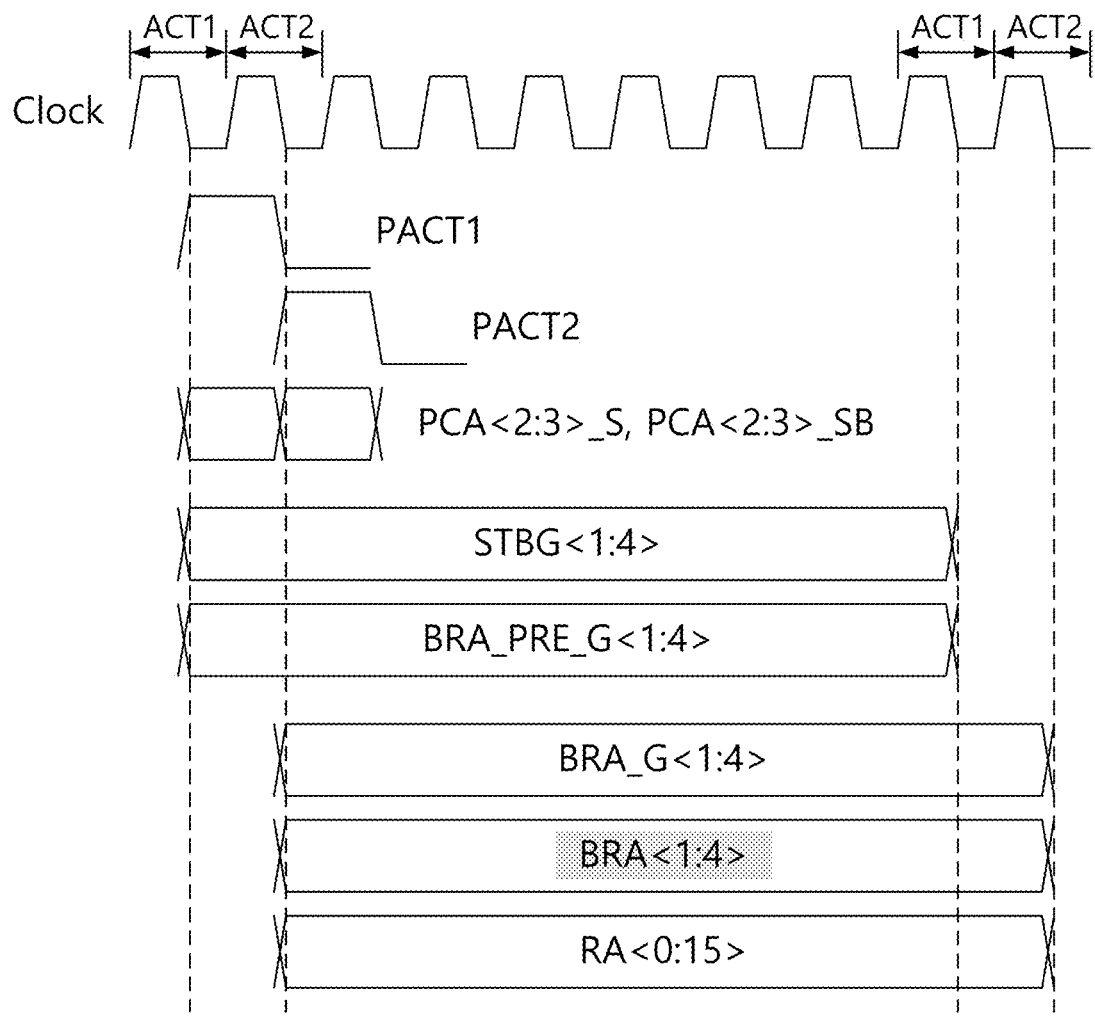
FIG. 4 is a timing diagram illustrating signals generated in a memory device of FIG. 1 when an active request of a memory bank is received.
Figure 5:
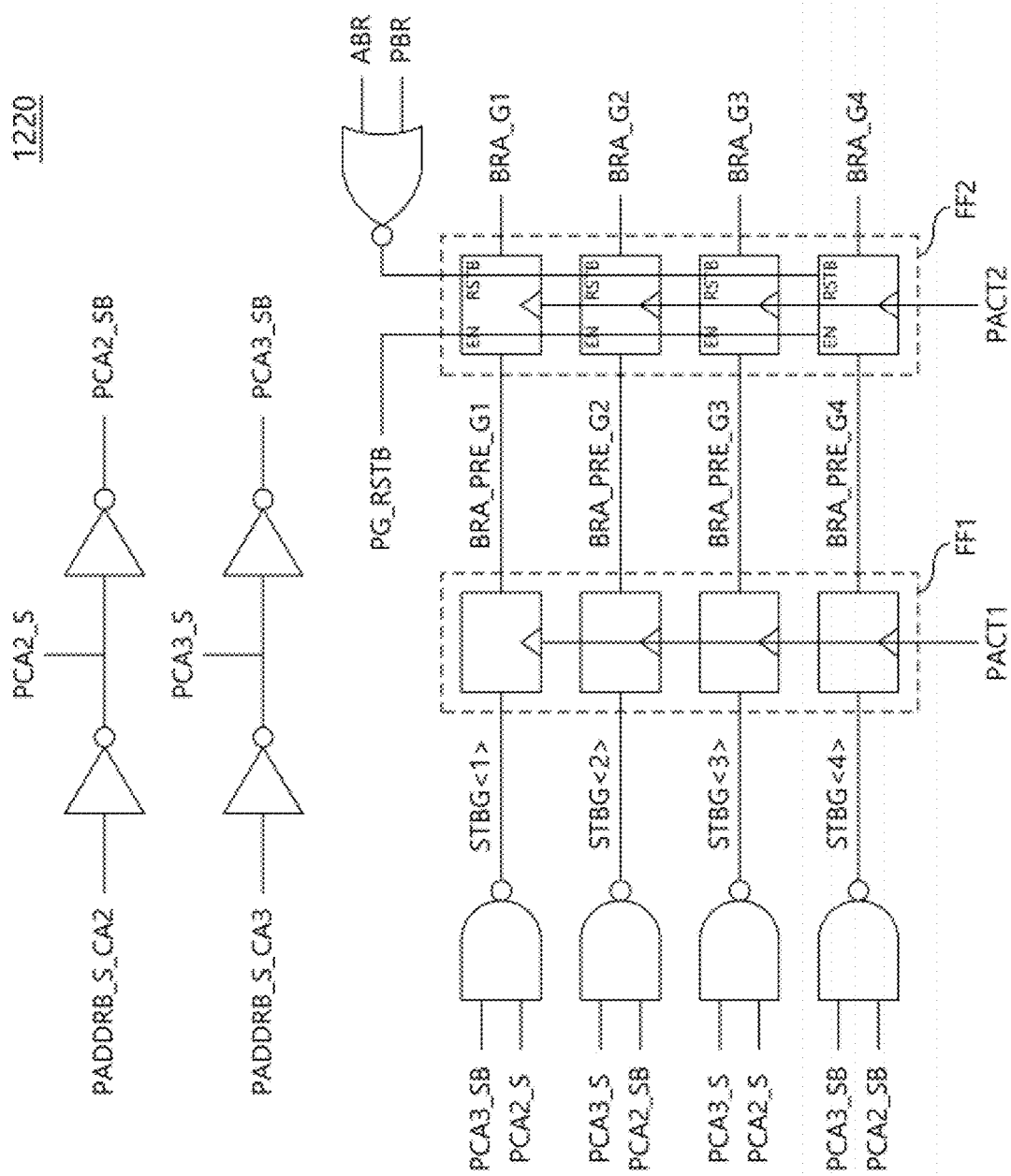
FIG. 5 is a diagram illustrating control logic for generating intermediate signals to generate a repeater driving signal of FIG. 3.
Figure 6:
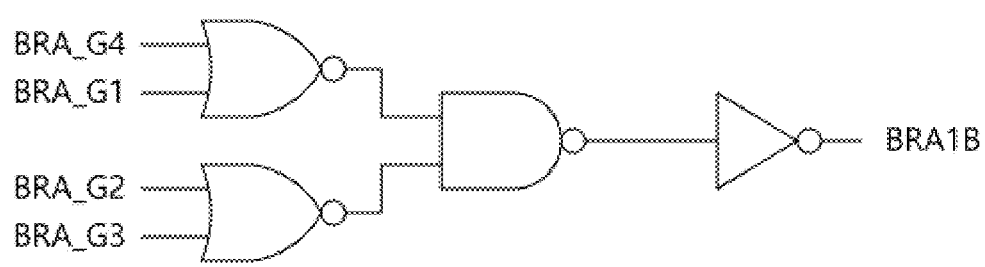
FIG. 6 is a diagram illustrating control logic for generating a repeater driving signal of FIG. 3 by using intermediate signals of FIG. 5.
Figure 6:
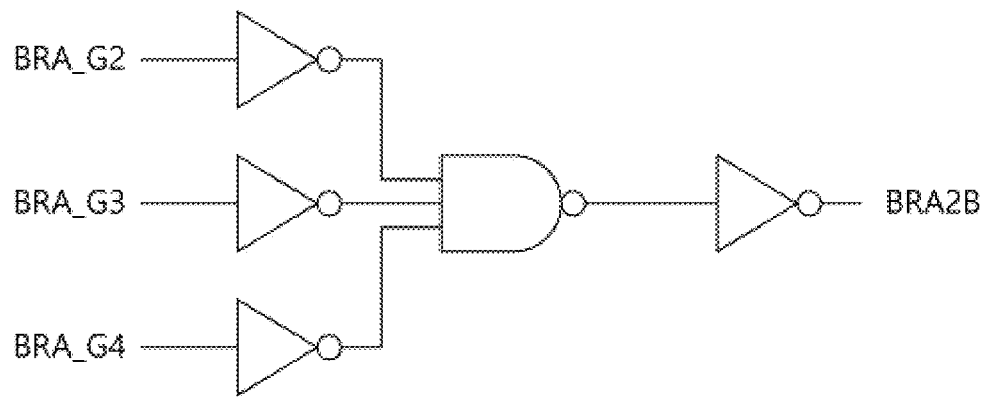
Figure 6:
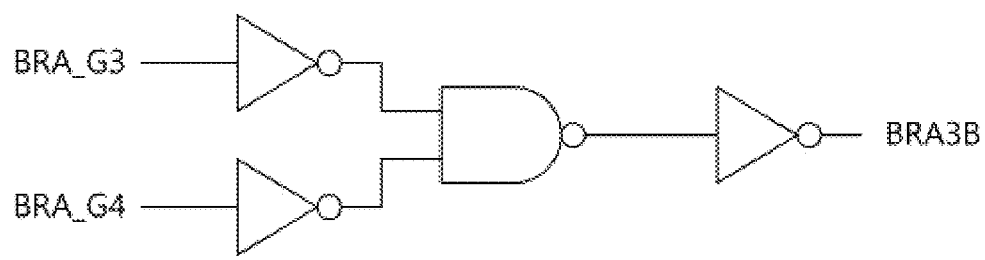
Figure 6:
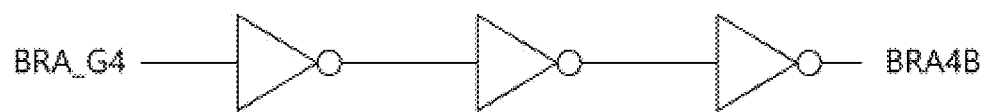

FIG. 4 is a timing diagram illustrating signals generated in a memory device of FIG. 1 when an active request of a memory bank is received. FIG. 5 is a diagram illustrating control logic for generating intermediate signals to generate a repeater driving signal of FIG. 3. FIG. 6 is a diagram illustrating control logic for generating a repeater driving signal of FIG. 3 by using intermediate signals of FIG. 5. Referring to FIGS. 3 to 6, the control logic 1220 may generate a repeater driving signal corresponding to the row address repeater groups 1231, 1232, 1233, and 1234, respectively, to control the row address repeaters 1230 for each row address repeater group.

According to an embodiment, the control logic 1220 may receive a clock signal Clock from the memory controller 1100 of FIG. 1. The control logic 1220 may receive active commands ACT1 and ACT2 from the memory controller 1100 based on the clock signal Clock. For example, the control logic 1220 may generate a first internal active signal PACT1 based on a falling edge of the first active command ACT1 and may generate a second internal active signal PACT2 based on a falling edge of the second active command ACT2. The control logic 1220 may obtain an internal command address signal PCA by decoding command address information CA received from the memory controller 1100 using the internal active signals PACT1 and PACT2 as internal clocks. For example, the control logic 1220 may obtain internal command addresses PCA2_S, PCA3_S, PCA2_SB, and PCA3_SB or PCA<2:3>_S and PCA<2:3>_SB from the command addresses PADDRB_S_CA2 and PADDRB_S_CA3 received through the input/output pad.

According to an embodiment, the control logic 1220 may generate the start bank group signals STBG<1:4> based on the internal command addresses PCA<2:3>_S and PCA<2:3>_SB. The control logic 1220 may use the start bank group signals STBG<1:4> as first intermediate signals for generating the repeater driving signals BRA<1:4>. For example, the control logic 1220 may perform a NAND operation on the internal command addresses PCA<2:3>_S and PCA<2:3>_SB in units of two to generate the start bank group signals STBG<1:4>. The control logic 1220 may generate pre-bank row address group signals BRA_PRE_G<1:4> based on the start bank group signals STBG<1:4> through first flip-flops FF1 that operates depending on the first internal active signal PACT1. Each of the pre-bank row address group signals BRA_PRE_G<1:4> may be maintained for a specified time (e.g., until the second internal active signal PACT2 rises to a high level). The control logic 1220 may generate bank row address group signals BRA_G<1:4> based on the pre-bank row address group signals BRA_PRE_G<1:4> through second flip-flops FF2 that operates depending on the second internal active signal PACT2. The second flip-flops FF2 may be reset depending on a signal PG RSTB that is enabled low for a power-down enable (PDE). The second flip-flops FF2 may be initialized depending on a NOR operation result of an all-bank refresh signal ABR and a refresh signal PBR for each bank.

According to an embodiment, the bank row address group signals BRA_G<1:4> may include active information of the corresponding bank groups. The control logic 1220 may use the bank row address group signals BRA_G<1:4> as second intermediate signals for generating the repeater driving signals BRA<1:4>. For example, the first bank row address group signal BRA_G1 may include active information of the first bank group (e.g., 2111 to 2114 in FIG. 2). The second bank row address group signal BRA_G2 may include active information of the second bank group (e.g., 2121 to 2124 in FIG. 2). The third bank row address group signal BRA_G3 may include active information of the third bank group (e.g., 2131 to 2134 in FIG. 2). The fourth bank row address group signal BRA_G4 may include active information of the fourth bank group (e.g., 2141 to 2144 in FIG. 2).

According to an embodiment, the control logic 1220 may generate the repeater driving signals BRA<1:4> based on the bank row address group signals BRA_G<1:4>. For example, the control logic 1220 may generate a first operation result obtained by performing a NOR operation on the first bank row address group signal BRA_G1 and the fourth bank row address group signal BRA_G4. For example, the control logic 1220 may generate a second operation result obtained by performing a NOR operation on the second bank row address group signal BRA_G2 and the third bank row address group signal BRA_G3. The control logic 1220 may perform a NAND operation on the first operation result and the second operation result and may invert a result of the NAND operation to generate an inverted signal BRA1B of the first repeater driving signal BRA1.

Also, the control logic 1220 may perform a NAND operation on an inverted signal of the second bank row address group signal BRA_G2, an inverted signal of the third bank row address group signal BRA_G3, and an inverted signal of the fourth bank row address group signal BRA_G4 and may invert a result of the NAND operation to generate an inverted signal BRA2B of the second repeater driving signal BRA2. Also, the control logic 1220 may perform a NAND operation on the inverted signal of the third bank row address group signal BRA_G3 and the inverted signal of the fourth bank row address group signal BRA_G4 and may invert a result of the NAND operation to generate an inverted signal BRA3B of the third repeater driving signal BRA3. In addition, the control logic 1220 may invert the fourth bank row address group signal BRA_G4 three times to generate an inverted signal BRA4B of the fourth repeater driving signal BRA4. For example, the control logic 1220 may adjust the timing of the repeater driving signals BRA<1:4> by adding an inverter in the operation process.

As described above, the control logic 1220 may generate the repeater driving signals BRA<1:4> through various logic circuits. For example, when only the first bank group is activated, the first repeater driving signal BRA1 may have a high level (BRA1 may have a high level by having at least one of the second intermediate signals at a high level), and the remaining repeater driving signals BRA<2:4> may have a low level. When only the second bank group is activated, the first repeater driving signal BRA1 and the second repeater driving signal BRA2 have a high level BRA2 may have a high level by having signals corresponding to the second to fourth bank groups among the second intermediate signals at a high level), and the remaining repeater driving signals BRA<3:4> have a low level. When only the third bank group is activated, the first repeater driving signal BRA1, the second repeater driving signal BRA2, and the third repeater driving signal BRA3 have a high level (BRA3 may have a high level by having signals corresponding to the third and fourth bank groups among the second intermediate signals at a high level), and the remaining fourth repeater driving signal BRA4 may have a low level. When only the fourth bank group is activated, the first repeater driving signal BRA1, the second repeater driving signal BRA2, the third repeater driving signal BRA3, and the fourth repeater driving signal BRA4 have a high level (BRA4 may have a high level by having a signal corresponding to the fourth bank group among the second intermediate signals at a high level). That is, when some of the memory banks 1210 are activated, the memory device 1200 may control (e.g., selectively activate subsets of the row address repeaters) the row address repeaters for each bank group and may reduce power consumed by the row address repeaters.

Figure 7:
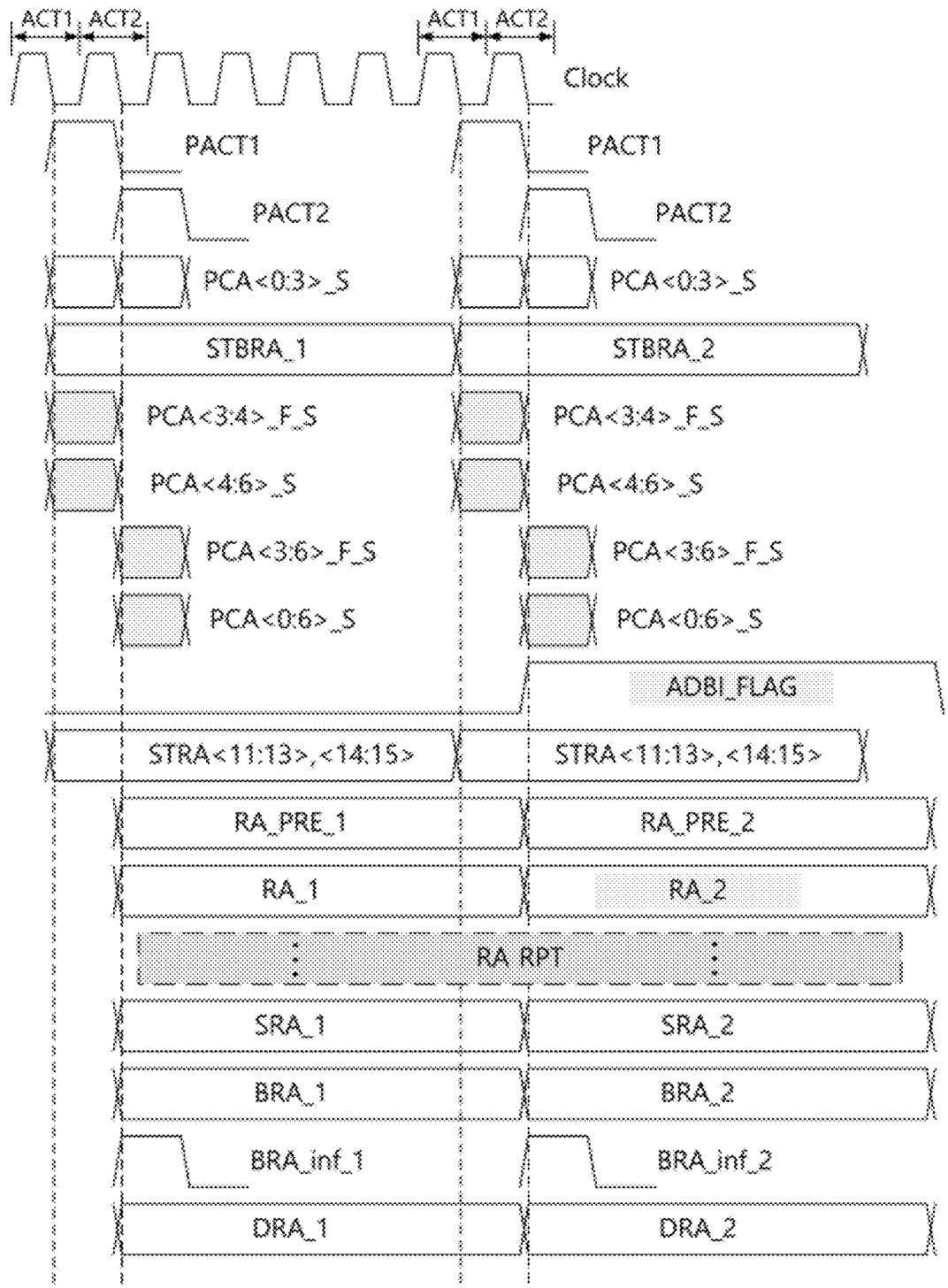
FIG. 7 is a timing diagram illustrating a process in which a row address is transferred using a data bus inversion operation in the memory device of FIG. 1 when an active request of a memory bank is received.
Figure 8:
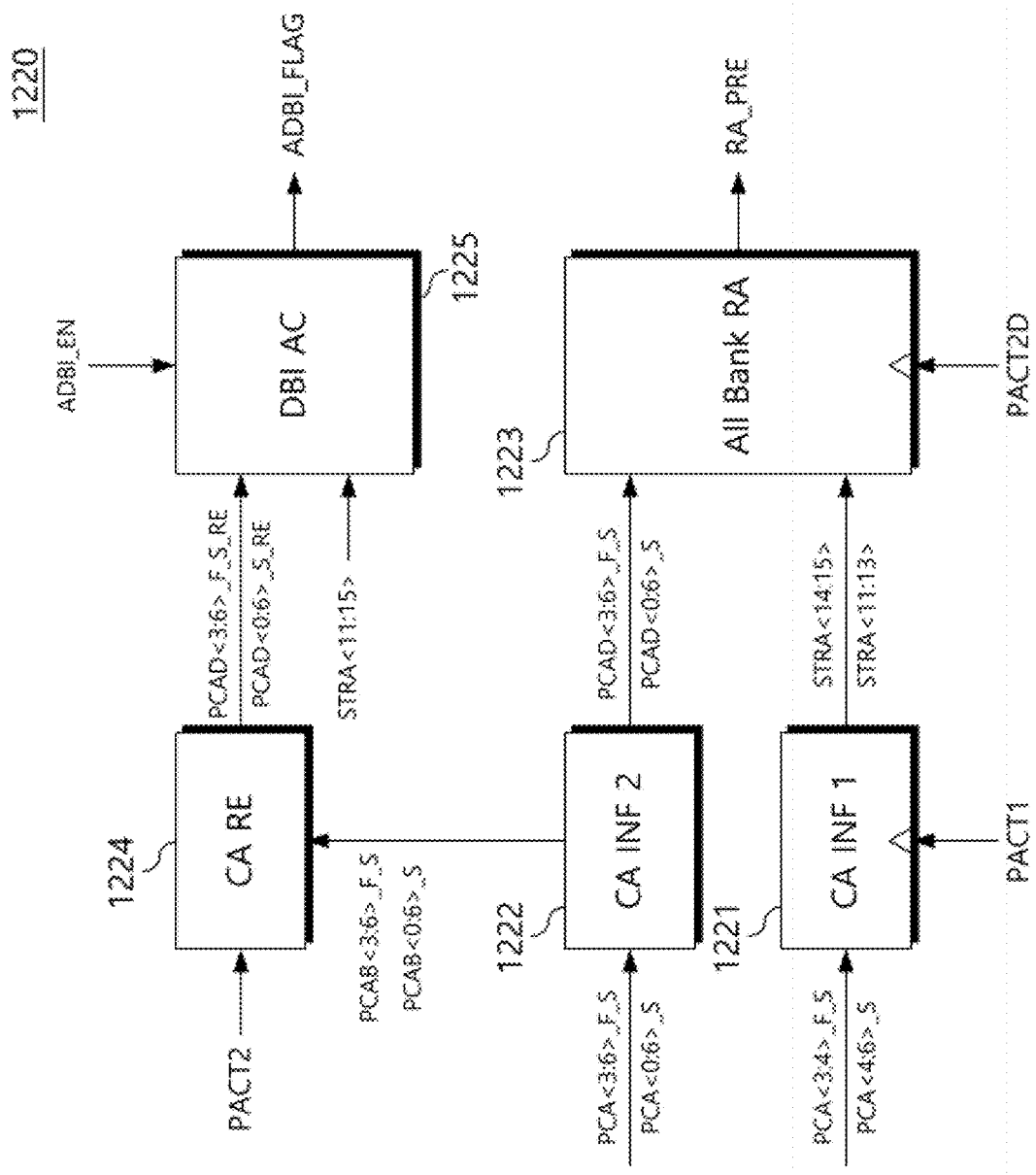
FIG. 8 is a diagram illustrating control logic for performing a data bus inversion operation.
Figure 9:
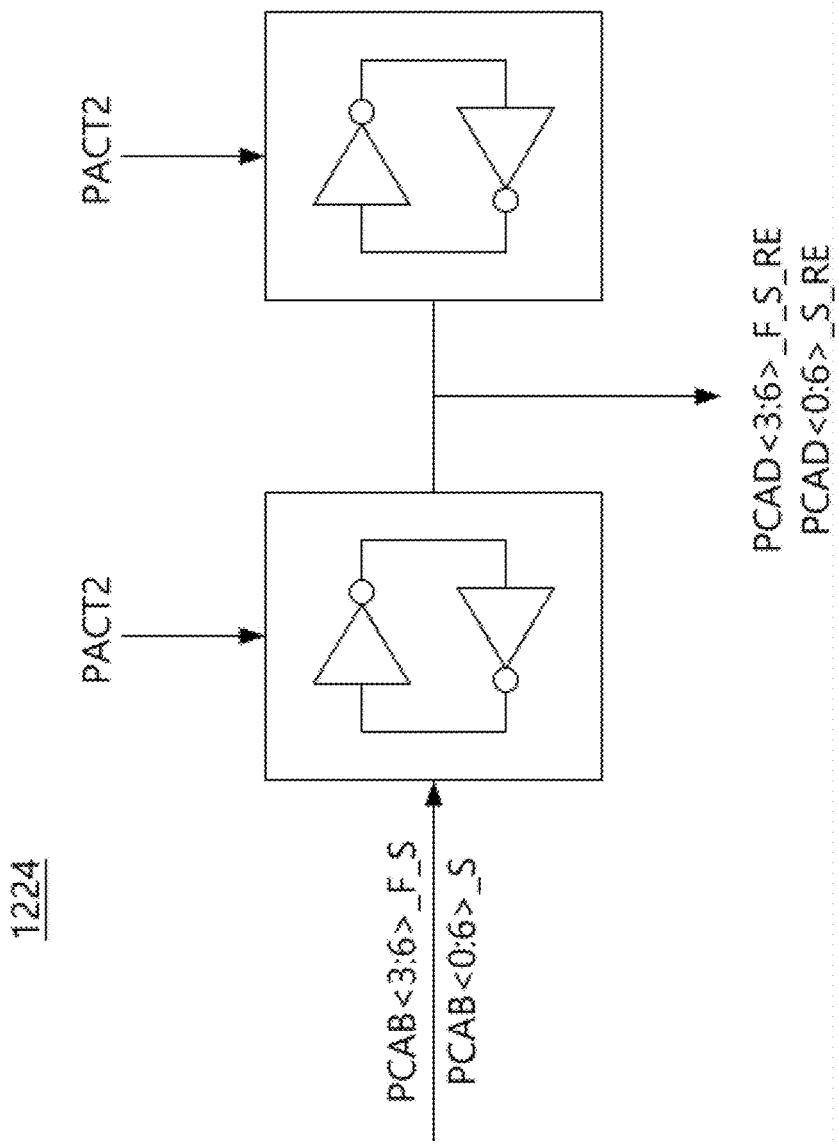
FIG. 9 is a diagram illustrating a command address replication circuit of FIG. 8.
Figure 10:
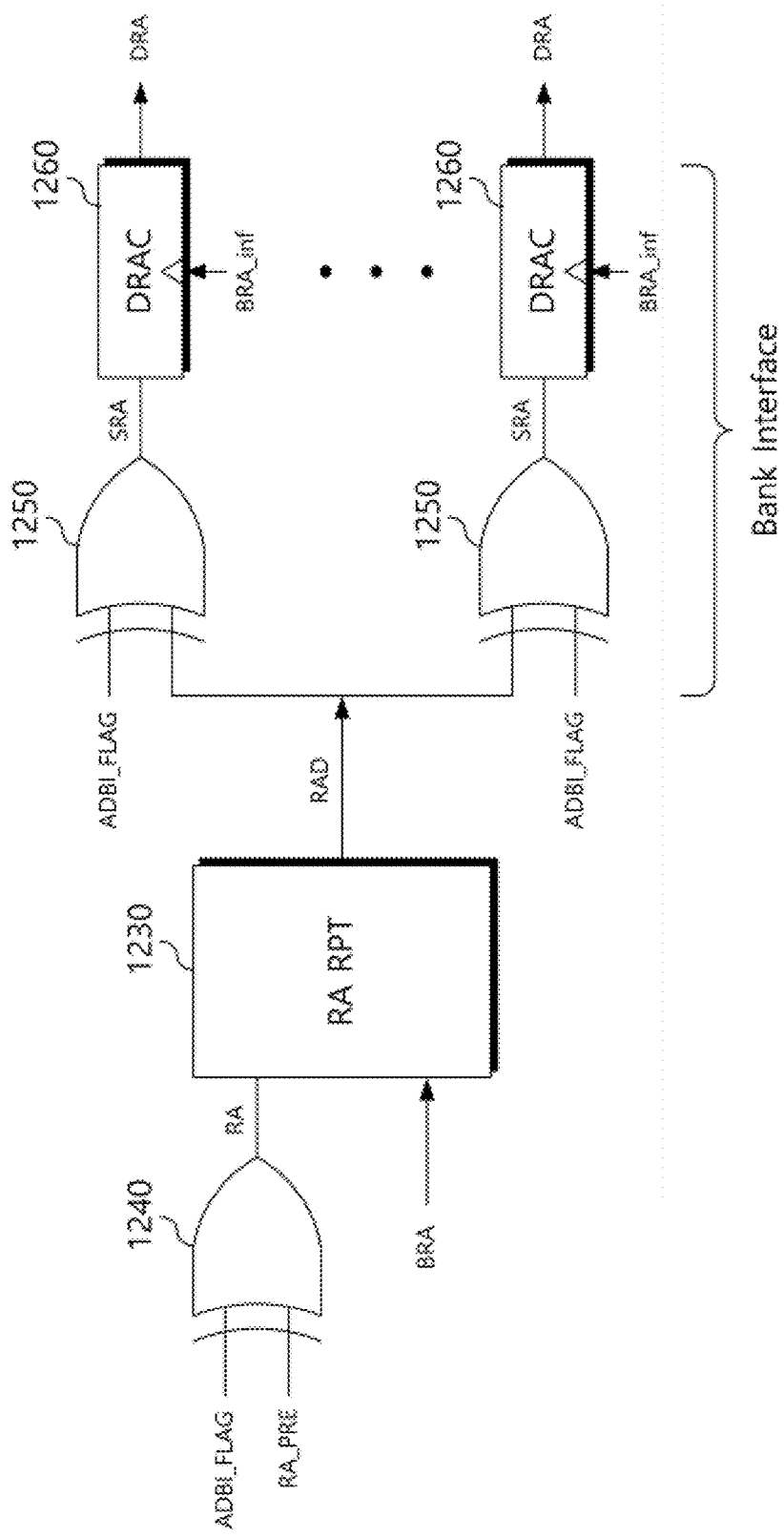
FIG. 10 is a diagram illustrating a circuit for transferring a row address on which a data bus inversion operation is performed to a memory bank.

FIG. 7 is a timing diagram illustrating a process in which a row address is transferred using a data bus inversion operation in the memory device of FIG. 1 when an active request of a memory bank is received. FIG. 8 is a diagram illustrating control logic for performing a data bus inversion operation. FIG. 9 is a diagram illustrating a command address replication circuit of FIG. 8. FIG. 10 is a diagram illustrating a circuit for transferring a row address on which a data bus inversion operation is performed to a memory bank. Referring to FIGS. 7 to 10, when a data bus inversion flag is enabled, the row address repeaters 1230 may transfer the inverted row address and a bank interface may restore the row address to transfer the memory banks 1210.

According to an embodiment, the control logic 1220 may receive the clock signal Clock from the memory controller 1100 of FIG. 1. The control logic 1220 may receive the active commands ACT1 and ACT2 from the memory controller 1100 based on the clock signal Clock. For example, the control logic 1220 may generate the first internal active signal PACT1 based on a falling edge of the first active command ACT1 and may generate the second internal active signal PACT2 based on a falling edge of the second active command ACT2. The control logic 1220 may obtain an internal command address signal PCA<0:3>_S by decoding the command address information CA received from the memory controller 1100 using the internal active signals PACT1 and PACT2 as internal clocks. As an example, the internal command address signals PCA<0:3>_S may be obtained based on circuits of FIG. 5.

According to an embodiment, the control logic 1220 may generate start bank row address signals STBRA based on the internal command address signals PCA<0:3>_S. The start bank row address signals STBRA may correspond to the bank row address group signals BRA_G<1:4> of FIG. 4.

According to an embodiment, the control logic 1220 may generate first intermediate signals PCA<3:4>_F_S and PCA<4:6>_S for a data bus inversion operation based on the first internal active signal PACT1 and the internal command address signals PCA<0:3>_S. The control logic 1220 may generate second intermediate signals PCA<3:6>_F_S and PCA<0:6>_S for a data bus inversion operation based on the second internal active signal PACT2 and the internal command address signals PCA<0:3>_S.

According to an embodiment, a first command address information circuit 1221 of the control logic 1220 may generate start row address signals STRA<11:13> and STRA<14:15> based on the first intermediate signals PCA<3:4>_F_S and PCA<4:6>_S, according to the first internal active signal PACT1. A second command address information circuit 1222 of the control logic 1220 may generate second delayed intermediate signals PCAD<3:6>_F_S and PCAD<0:6>_S and second inverted intermediate signals PCAB<3:6>_F_S and PCAB<0:6>_S based on the second intermediate signals PCA<3:6>_F_S and PCA<0:6>_S.

According to an embodiment, an all bank row address generation circuit 1223 of the control logic 1220 may generate a pre-row address RA_PRE based on the start row address signals STRA<11:13> and STRA<14:15> and the second delayed intermediate signals PCAD<3:6>_F_S and PCAD<0:6>_S, according to a delayed second internal active signal PACT2D.

According to an embodiment, a command address replication circuit 1224 of the control logic 1220 may generate second replication intermediate signals PCAD<3:6>_F_S_RE and PCAD<0:6>_S_RE based on the second inverted intermediate signals PCAB<3:6>_F_S and PCAB<0:6>_S. For example, the command address replication circuit 1224 may capture the second inverted intermediate signals PCAB<3:6>_F_S and PCAB<0:6>_S at the rising edge of the second internal active signal PACT2 to generate the second replication intermediate signals PCAD<3:6>_F_S_RE and PCAD<0:6>_S_RE. For example, the command address replication circuit 1224 may include two latches that are driven based on the second internal active signal PACT2. Through these two latches, the command address replication circuit 1224 may output the second replication intermediate signals PCAD<3:6>F_S_RE and PCAD<0:6>_S_RE based on the second inverted intermediate signals PCAB<3:6>_F_S and PCAB<0:6>_S at the rising edge of the second internal active signal PACT2.

According to an embodiment, a data bus inversion operation circuit 1225 of the control logic 1220 may generate a data bus inversion flag ADBI FLAG by comparing a previous row address value with a current row address value. For example, the data bus inversion operation circuit 1225 may compare the second replication intermediate signals PCAD<3:6>_F_S RE and PCAD<0:6>_S_RE corresponding to a first pre-row address RA_PRE_1 with the start row address signals STRA<11:13> and STRA<14:15> corresponding to a second pre-row address RA_PRE_2. That is, the data bus inversion operation circuit 1225 may output the data bus inversion flag ADBI_FLAG of a high level when the number of bits changed between the first pre-row address RA_PRE_1 and the second pre-row address RA_PRE_2 is more than half of the number of bits.

According to an embodiment, a first XOR circuit 1240 may output the row address RA by performing an XOR operation on the data bus inversion flag ADBI_FLAG and the pre-row address RA_PRE. For example, when the number of bits changed between the row address at the previous active request and the row address at the current active request is less than half of the number of bits, the data bus inversion flag ADBI_FLAG has a low level, and the pre-row address RA_PRE may be transferred to the row address repeaters 1230 as the row address RA as it is. When the number of bits changed between the row address at the previous active request and the row address at the current active request is more than half of the number of bits, the data bus inversion flag ADBI_FLAG has a high level, and the pre-row address RA_PRE may be inverted and then may be transferred to the row address repeaters 1230 as the row address RA. Accordingly, in the row address RA transferred to the row address repeaters 1230, the number of transitions from the previous state decreases, and power consumed by the row address repeaters 1230 may be reduced.

According to an embodiment, the row address repeaters 1230 may transfer the row address RA to the bank groups, based on the repeater driving signals BRA (e.g., the repeater driving signals BRA<1:4> of FIG. 3). Second XOR circuits 1250 may perform an XOR operation on the delayed row address RAD transferred through the row address repeaters 1230 and the data bus inversion flag ADBI_FLAG to output a restored row address SRA. The restored row address SRA may have the same value as the pre-row address RA_PRE.

Row address decoding circuits 1260 may output a decoded row address DRA based on the restored row address SRA, according to the repeater driving information signal BRA_inf. For example, when the number of bits changed between the row address at the previous active request and the row address at the current active request is less than half, the data bus inversion flag ADBI_FLAG has a low level, and the delayed row address RAD may be transferred to the row address decoding circuits 1260 as the delayed row address RAD as it is. The decoded row address DRA may be transferred to each memory bank to activate a memory bank.

As described above, the memory device 1200 may invert the row address such that the transition of state is reduced by comparing the previous row address with the current row address. Accordingly, even when the fourth bank group is activated in FIG. 2 and all the row address repeaters 1230 are driven, power consumed by the row address repeaters 1230 may be reduced.

According to an embodiment of the present disclosure, when an active operation is performed only on a memory bank close (closer or closest) to an input/output pad by controlling a row address repeater for each group of memory banks, power consumption in row address repeaters corresponding to the remaining memory banks may be reduced.

According to an embodiment of the present disclosure, power consumption in the row address repeater may be reduced by performing data bus inversion on a row address input to the row address repeater even when the active operation of the memory bank far (further or furthest) from an input/output pad is performed.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A memory device comprising:
   memory banks including a plurality of memory cells;
   row address repeaters configured to transfer a row address to the memory banks; and
   a control logic configured to control data input/output of the memory banks, and
   wherein the memory banks are grouped into a plurality of bank groups,
   wherein the row address repeaters are grouped into a plurality of repeater groups respectively corresponding to the plurality of bank groups,
   wherein at least one repeater group among the plurality of repeater groups is configured to transfer the row address to a different repeater group among the plurality of repeater groups,
   wherein the control logic is configured to control the row address repeaters according to activation status of respective ones of the plurality of bank groups and corresponding distances of the respective ones of the plurality of bank groups from an input/output pad.

2. The memory device of claim 1, wherein the control logic is configured to drive one or more repeater groups among the plurality of repeater groups corresponding to an activated bank group among the plurality of bank groups, based on an active request received from a controller.

3. The memory device of claim 1, wherein the control logic is configured to drive at least one of the repeater groups corresponding to at least one of the bank groups having a smaller distance from the input/output pad than that of an activated bank group among the plurality of bank groups without driving at least one other of the repeater groups corresponding to at least one other of the bank groups having a larger distance from the input/output pad than that of the activated bank group.

4. The memory device of claim 1, wherein the plurality of bank groups includes:
a first bank group closest to the input/output pad;
a second bank group spaced apart from the input/output pad further than the first bank group; and
a third bank group spaced apart from the input/output pad further than the second bank group, and
wherein the plurality of repeater groups include:
a first repeater group configured to transfer the row address to the first bank group;
a second repeater group configured to transfer the row address to the second bank group; and
a third repeater group configured to transfer the row address to the third bank group, and
wherein the control logic is configured to drive the first repeater group without driving the second repeater group and the third repeater group when the first bank group is activated and the second bank group and the third bank group are deactivated.

5. The memory device of claim 4, wherein the control logic is configured to drive the first repeater group and the second repeater group without driving the third repeater group when the second bank group is activated, and the first bank group and the third bank group are deactivated.

6. A memory device comprising:
memory banks including a plurality of memory cells;
row address repeaters configured to transfer a current row address to the memory banks; and
a control logic configured to control data input/output of the memory banks, and
wherein the memory banks are grouped into a plurality of bank groups,
wherein the row address repeaters are grouped into a plurality of repeater groups respectively corresponding to the plurality of bank groups,
wherein ones of the plurality of repeater groups are electrically connected to each other,
wherein the control logic is configured to activate or deactivate each of the plurality of repeater groups according to activation status of a respective one of the plurality of bank groups and a corresponding distance of the respective one of the plurality of bank groups from an input/output pad, and
wherein the control logic is configured to control the row address repeaters of each of the repeater groups to activate the memory banks of each of the bank groups, and perform a data bus inversion operation on the current row address to transfer an inverted row address to the row address repeaters of each of the repeater groups.

7. The memory device of claim 6, wherein the control logic is configured to invert the current row address to provide the inverted row address for the row address repeaters of each of the repeater groups when more than half of bits of the current row address are changed from a previous row address.

8. The memory device of claim 6, wherein the control logic is configured to generate a first intermediate signal including information of a previous row address based on a previous active request, a second intermediate signal including information of the current row address based on a current active request, and a data bus inversion flag by comparing the first intermediate signal with the second intermediate signal.

9. The memory device of claim 8, wherein the control logic, when more than half of bits of the second intermediate signal are changed from the first intermediate signal, is configured to generate the data bus inversion flag to have a high level, and provide a result value for the row address repeaters of each of the repeater groups obtained by performing an XOR operation on the data bus inversion flag and the current row address.

10. The memory device of claim 8, wherein the control logic, when less than half of bits of the second intermediate signal are changed from the first intermediate signal, is configured to generate the data bus inversion flag to have a low level, and provide a result value for the row address repeaters of each of the repeater groups obtained by performing an XOR operation on the data bus inversion flag and the current row address.

11. The memory device of claim 6, wherein the control logic is configured to provide the current row address for the row address repeaters of each of the repeater groups without inverting the current row address when less than half of bits of the current row address are changed from a previous row address.

12. A memory device comprising:
memory banks including a plurality of memory cells;
row address repeaters configured to transfer a row address to the memory banks; and
a control logic configured to control data input/output of the memory banks, and
wherein the memory banks are grouped into a first bank group and a second bank group,
wherein the row address repeaters are grouped into a first repeater group corresponding to the first bank group and a second repeater group corresponding to the second bank group,
wherein the first repeater group is configured to transfer the row address to the first bank group and the second repeater group,
wherein the second repeater group is configured to transfer the row address to the second bank group, and
wherein the control logic, when an active request corresponding to a memory bank of the first bank group is received without an active request corresponding to a memory bank of the second bank group, is configured to drive the first repeater group without driving the second repeater group.

13. The memory device of claim 12, wherein the first bank group is closer to an input/output pad than the second bank group.

14. The memory device of claim 12, wherein the memory banks are further grouped into a third bank group and a fourth bank group, and
wherein the row address repeaters are further grouped into a third repeater group corresponding to the third bank group and a fourth repeater group corresponding to the fourth bank group,
wherein the first repeater group is configured to transfer the row address to the first bank group and the second repeater group, based on a first repeater driving signal, wherein the second repeater group is configured to transfer the row address to the second bank group and the third repeater group, based on the first repeater driving signal and a second repeater driving signal, wherein the third repeater group is configured to transfer the row address to the third bank group and the fourth repeater group, based on the first repeater driving signal, the second repeater driving signal, and a third repeater driving signal, and wherein the fourth repeater group is configured to transfer the row address to the fourth bank group, based on the first repeater driving signal, the second repeater driving signal, the third repeater driving signal, and a fourth repeater driving signal.

15. The memory device of claim 14, wherein the control logic is configured to generate a first internal active signal having a first timing and a second internal active signal having a second timing that is later than the first timing of the first internal active signal based on a clock signal received from a controller, obtain internal command address signals from command address information received from the controller based on the first internal active signal and the second internal active signal, generate first intermediate signals by performing a NAND operation on the internal command address signals, generate second intermediate signals based on the first intermediate signals in accordance with the second timing of the second internal active signal, and perform a logical operation on the second intermediate signals to generate the first to fourth repeater driving signals.

16. The memory device of claim 15, wherein the first repeater driving signal has a high level when at least one of the second intermediate signals is at a high level, wherein the second repeater driving signal has a high level when signals corresponding to the second to fourth bank groups among the second intermediate signals are at a high level, wherein the third repeater driving signal has a high level when signals corresponding to the third and fourth bank groups among the second intermediate signals are at a high level, and wherein the fourth repeater driving signal has a high level when a signal corresponding to the fourth bank group among the second intermediate signals is at a high level.

17. The memory device of claim 12, further comprising:
a first XOR circuit configured to perform an XOR operation on a data bus inversion flag and a current pre-row address to output the row address;
a second XOR circuit configured to perform an XOR operation on the data bus inversion flag and a delayed row address transferred through the row address repeaters to output a restored row address; and a row address decoding circuit configured to decode the restored row address to generate a decoded row address and to transfer the decoded row address to the memory banks, and wherein the control logic is configured to compare a previous row address with the current pre-row address and generates the data bus inversion flag based on a number of transitioned bits of the current pre-row address.

18. The memory device of claim 17, wherein the control logic is configured to compare the previous row address with the current pre-row address, and generate the data bus inversion flag having a high level when the number of transitioned bits of the current pre-row address is more than half of bits of the current pre-row address, wherein the first XOR circuit is configured to output the row address obtained by inverting the current pre-row address, and wherein the second XOR circuit is configured to output the restored row address obtained by inverting the delayed row address.

19. The memory device of claim 17, wherein the control logic is configured to compare the previous row address with the current pre-row address, and generate the data bus inversion flag having a low level when the number of transitioned bits of the current pre-row address is less than half of bits of the current pre-row address, wherein the first XOR circuit is configured to output the row address that is same as the current pre-row address, and wherein the second XOR circuit is configured to output the restored row address that is same as the delayed row address.

20. The memory device of claim 12, wherein the control logic is configured to generate previous internal active signals corresponding to a previous active request and current internal active signals corresponding to a current active request based on a clock signal received from a controller, obtain previous internal command address signals from previous command address information received from the controller based on the previous internal active signals, obtain current internal command address signals from current command address information received from the controller based on the current internal active signals, obtain a first intermediate signal including information of a previous row address from the previous internal command address signals, obtain a second intermediate signal including information of the row address from the current internal command address signals, and generate a data bus inversion flag by comparing the first intermediate signal with the second intermediate signal.

* * * * *